(12) United States Patent
Feigl et al.

(10) Patent No.: US 7,909,336 B2
(45) Date of Patent: Mar. 22, 2011

(54) ARRANGEMENT OF A SHAFT WITH A MECHANICAL FACE SEAL MOUNTED THEREON

(75) Inventors: Peter Feigl, Höhenrain (DE); Andreas Lederer, Glogauerstrasse (DE); Clemens Simon, Starnberg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 426 days.

(21) Appl. No.: 11/793,292

(22) PCT Filed: Dec. 1, 2005

(86) PCT No.: PCT/EP2005/012794
§ 371 (c)(1),
(2), (4) Date: Jun. 18, 2007

(87) PCT Pub. No.: WO2006/066692
PCT Pub. Date: Jun. 29, 2006

(65) Prior Publication Data
US 2008/0217862 A1    Sep. 11, 2008

(30) Foreign Application Priority Data
Dec. 21, 2004 (DE) .................. 20 2004 019 718 U

(51) Int. Cl.
*F16J 15/34* (2006.01)
(52) U.S. Cl. ........................................ 277/408
(58) Field of Classification Search .......... 277/358, 277/370, 371, 408, 431, 432, 401
See application file for complete search history.

(56) References Cited

U.S. PATENT DOCUMENTS

| | | | |
|---|---|---|---|
| 3,560,004 A | | 2/1971 | Donley |
| 4,294,454 A | * | 10/1981 | Cannings ................. 277/366 |
| 4,558,870 A | | 12/1985 | Martinez |
| 4,634,134 A | | 1/1987 | Entrikin |
| 5,938,206 A | * | 8/1999 | Klosterman et al. ........ 277/399 |

FOREIGN PATENT DOCUMENTS

DE    31 46 844 C1    5/1983
(Continued)

OTHER PUBLICATIONS

German Search Report dated Mar. 1, 2005.
(Continued)

*Primary Examiner* — Shane Bomar
*Assistant Examiner* — Gilbert Y Lee
(74) *Attorney, Agent, or Firm* — Scott D. Wofsy; Edwards Angell Palmer & Dodge LLP

(57) ABSTRACT

An arrangement of a shaft with a slip-ring seal mounted thereon is disclosed. The slip-ring seal (3) comprises a pair of cooperating slip rings (4,5), the sealing faces of which define a sealing gap (6) between them. One of the slip rings is mounted on the shaft (2) with torque transmission from a drive element (9) mounted on the shaft, whilst the other slip ring is provided for fixed mounting on a stationary component. The arrangement is characterised in that the drive element (9) comprises a tubular drive housing (11), extending over the external circumference of the slip ring (4) with a radial gap (12) and a passage (13) for introduction of a flow medium is provided, opening out at one end in a chamber (A), defined by the drive housing (11), which drains out through the radial gap (12), whereby the radial gap forms a flow path for the flow medium which terminates at or near the sealing gap (6).

6 Claims, 1 Drawing Sheet

FOREIGN PATENT DOCUMENTS

| | | |
|---|---|---|
| DE | 295 12 325 U1 | 11/1995 |
| DE | 195 25 343 A1 | 1/1997 |
| DE | 199 03 067 A1 | 8/2000 |
| EP | 1 113 176 A2 | 7/2001 |
| GB | 1 340 341 | 12/1973 |

OTHER PUBLICATIONS

International Search Report dated Feb. 23, 2006.

Burgmann Lexikon, ABC der Gleitringdichtung, Erste Ausgabe, Self-published, 1988, pp. 156 and 236.

* cited by examiner

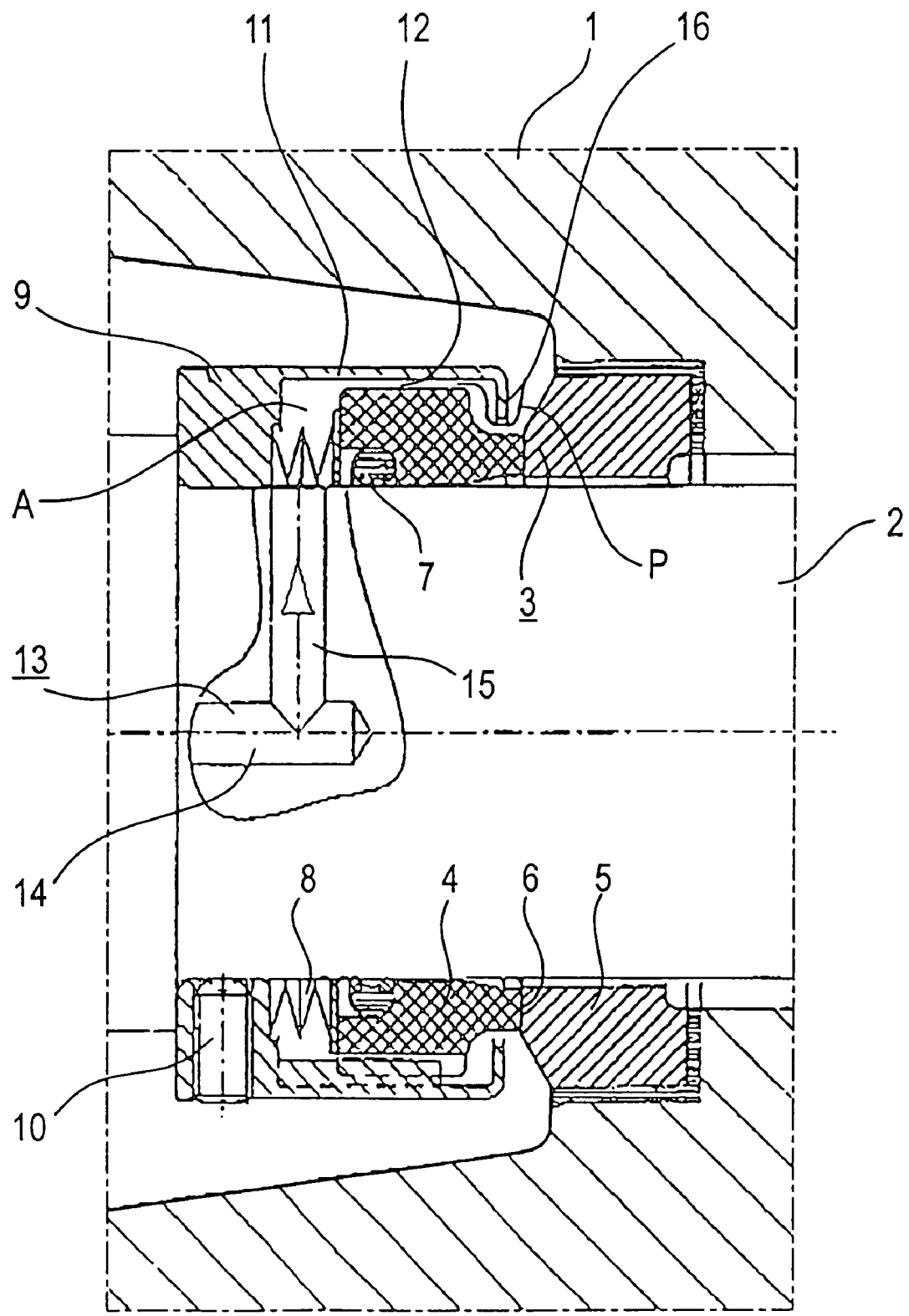

ARRANGEMENT OF A SHAFT WITH A MECHANICAL FACE SEAL MOUNTED THEREON

BACKGROUND OF THE INVENTION

1. Field of the Invention

The invention relates to an arrangement of a shaft with a mechanical face seal mounted thereon. It relates, in particular, to an arrangement of a type mentioned in the preamble of the main claim which is especially suitable for sealing refrigerant compressors in motor vehicle air conditioning systems.

2. Description of Related Art

Mechanical face seals are known (Burgmann, ABC der Gleitringdichtung, self published 1988, page 156), wherein a torque is transmitted to the rotary seal ring through a driver device which is mounted on the shaft for rotation in common therewith. Furthermore, it is known (Burgmann, as above, page 236) to let a buffer fluid from an external source circulate through a chamber which is separated from the external environment and surrounds the seal gap of a mechanical face seal.

SUMMARY OF THE INVENTION

The object of the invention is to produce an arrangement of the type in question, which can have an uncomplicated robust construction and is suitable for mass production, and which can prevent dry-running of the mechanical face seal in the presence of liquids requiring sealing such as compressor oil that contains dissolved gases. In particular the arrangement should be suitable for the application in refrigerant compressors.

In accordance with the invention, this object is achieved by an arrangement of a shaft with a mechanical face seal mounted thereon, said mechanical face seal comprising a pair of cooperating seal rings whose seal faces delimit a seal gap between each other, wherein one of the seal rings is disposed on the shaft in torque transmitting relationship with a driver member mounted on the shaft, whilst the other seal ring is provided for non-rotational mounting on a stationary component. The arrangement is characterized in that the driver member comprises a tubular driver housing extending around the outer periphery of the seal ring with a radial gap therebetween, and in that at least one passage for introducing a flow medium is provided in the shaft, said passage opens out at one end in a chamber defined by the driver housing, which can be drained out through the radial gap, whereby the radial gap forms flow path for the flow medium which terminates at or near the seal gap.

By virtue of the measures in accordance with the invention, the effect is achieved that, in operation of the mechanical face seal, a sufficiently strong current of a liquid medium which may be the medium requiring sealing (e.g. compressor oil) is fed along the seal gap which is defined between the seal faces of the cooperating seal rings in order to carry away any gas bubbles that have collected there, possibly from the medium requiring sealing, so as to thereby ensure that there is always a liquid medium at the seal gap. Gas bubbles when having entered the seal gap can cause dry-running of the mechanical face seal and thus excessive wear because of inadequate lubrication of the seal faces. At the same time, the flow medium can effectively cool the rotary seal ring and thus protect the arrangement from damage due to overheating. In order to increase the effect produced by the flow, provision may be made for the driver housing to comprise an element for diverting the stream of the flow medium towards the seal gap. In accordance with another particularly advantageous embodiment of the invention, the medium can be forced to flow along the rotary seal ring and the seal gap without the need for an externally driven pumping means by providing the supply passage for the flow medium in the shaft with a section which emerges substantially radially at the mechanical face seal so that the flow medium is exposed to centrifugal forces due to the rotation of the shaft. These forces can produce a pumping effect.

Although the invention has been presented in connection with its preferred employment for the sealing of air-conditioning compressors for motor vehicles and the like, wherein the medium requiring sealing is an oil in which gases are frequently present in dissolved form, the invention is not restricted to this field of application. Rathermore, the invention can always be used to advantage whenever there is a danger of dry-running of the mechanical face seal due to a lack of lubrication by a liquid medium requiring sealing which is caused by the accumulation of gas bubbles and the like in the seal gap. These gas bubbles can settle out from the medium requiring sealing in the event of a sudden decrease of pressure and then accumulate in the vicinity of the seal gap so that gas can enter the seal gap, this thereby leading to the feared dry-running with the consequence of premature wear of the mechanical face seal.

BRIEF DESCRIPTION OF THE DRAWING

The invention will be described in more detail hereinafter with the aid of the drawing which is a longitudinal sectional view of an embodiment of the invention with parts broken away.

DETAILED DESCRIPTION OF THE PREFERRED EMBODIMENTS

In the drawing, the reference symbol 1 relates to the housing of an apparatus requiring sealing, e.g. the housing of an air conditioning compressor, and the reference symbol 2 relates to a shaft, e.g. the drive shaft of the air conditioning compressor, which is passed through a boring in the housing. The reference symbol 3 relates to a mechanical face seal for sealing the interior of the housing at a portion where the shaft 2 passes through the boring in the housing.

Basically, the mechanical face seal 3 can be of conventional design and hence comprises a pair of cooperating seal rings 4, 5 having opposed seal faces in radial or essentially radial planes which define between each other and axially and radially delimit a seal gap 6 when in operation. One of the seal rings, the seal ring 5, is held in non-rotational manner on the housing 1 in a suitable but not particularly depicted manner and is sealed with respect to the housing 1.

The other seal ring 4 is provided for rotation in common with the shaft 2. For this purpose, the seal ring 4 is seated on the shaft 2 in a loose fit, whereby a sealing relationship is provided between the outer periphery of the shaft 2 and the inner periphery of the seal ring 4 in that a secondary seal 7, preferably in the form of an O-ring, is arranged in a groove in the seal ring 4. The secondary seal 7 enables axial movement of the seal ring 4 relative to the shaft 2. Consequently, the seal ring 4 can be biased against the non-rotational seal ring 5 by the effect of a biasing device which is preferably in the form of one or more springs 8 in order to set the seal gap 6 in accord with the prevailing operational conditions.

The or each biasing spring 8 is supported at one of its axial ends on the facing rear side of the seal ring 4, whilst its other axial end rests on a driver member or driver ring 9. The driver ring 9 is seated on the shaft 2 and is fixed thereto in an appropriate manner, e.g. by means of a clamping screw 10 that is adapted to be screwed radially into the driver ring 9, so that the driver ring 9 rotates with the shaft 2.

A substantially tubular, peripherally closed driver housing 11 protrudes axially from the driver ring 9, which defines a chamber A that is axially bounded by the driver ring 9 and the seal ring 4 and, apart from a radial gap 12 defined between the inner periphery of the driver housing 11 and the outer periphery of the seal ring 4, is sealed with respect to the interior of the housing 1. The chamber A is thus in fluid connection with the radial gap 12. The axial extent of the driver housing 11 is preferably such that a main portion of the seal ring 4 is accommodated therein when in operation and only a short axial portion of the seal ring 4 near the seal gap 6 is outside the driver housing 11.

There is a torque transmitting relationship between the driver ring 9 and the seal ring 4 by means of a groove and tongue clutch which can be of conventional design and therefore does not need to be described in greater detail here. Other known types of clutch device could also be utilised.

A passage bearing the general reference symbol 13 for the supply of a liquid medium into the chamber A of the mechanical face seal 3 is provided in the shaft 2. In the embodiment shown, the passage 13 has an axial section 14 that is disposed centrally in the shaft 2 and a radial section 15 branching therefrom. The radial section 15 of the passage 13 emerges at a portion of the surface of the shaft 2 which is aligned with the chamber A of the mechanical face seal 3.

Although only one passage 13 having a radial section 15 is illustrated in the drawing, several passages 13 could also be provided in the shaft 2, or, several radial sections 15 which open out at circumferentially spaced angles between each other from the surface of the shaft 2 could branch out from a single axial section 14 so that the medium can be introduced into the chamber A at different positions.

As a result of the radial alignment of the section 15 of the passage 13, rotation of the shaft 2 produces a pumping effect on the medium in the radial section 15 due to centrifugal forces caused by the rotation so that the medium is forced to flow into the chamber A and along the radial gap 12 in order to emerge from the gap 12 at or close to the seal gap 6 and to flow off into the interior of the housing 1.

It is desirable upon leaving the radial gap 12, that a stream should be produced which flows directly along the outer peripheral portions of the two seal rings 4, 5 near the seal gap 6 in order to drag gas bubbles or other foreign particles which may have settled in the region near the seal gap 6 along therewith and return them to the interior of the housing 1 so as to ensure that the medium requiring sealing is only in liquid form at the seal gap 6. A flow diverting element 16 can be provided at the axial end of the driver housing 11 facing the seal gap 6 in order to promote this effect. In one simple embodiment, this may be a flange-like, radially inwardly directed bent portion of the driver housing 11 so that, in the vicinity of the seal gap 6, the initial axial flow of the medium is directed radially inwardly against the adjacent peripheral portion of the seal ring 4, as is indicated by the arrow P in the drawing.

The flow of medium along the radial gap 12 has a cooling effect on the seal ring 4 due to the fact that the flow medium can remove heat from the outer peripheral surface of the seal ring 4. Moreover, the stream of medium keeps the biasing springs 8, the radial gap 12 and the surface of the shaft 2 exposed to the chamber A free from impurities, e.g. deposits of foreign matter. Such deposits could impair the axial mobility of the seal ring 4.

While it is preferred that the radial gap 12 creates a throughput cross-section for the flow medium which is at least equal to, but preferably somewhat greater than the throughput cross-section of the passage 13, it also falls within the scope of the invention for the radial gap 2 to be dimensioned such that it has a throughput cross-section which is smaller than that of the passage 13, this being effective to produce an increased rate of flow in the gap 12.

Although the radial section 15 of the passage 13 generally produces an adequate pumping effect so that one can dispense with other means for forcibly advancing the medium through the passage 13, it also falls within the scope of the invention should this be so desired for additional or other suitable types of pumping means to be provided. In this case, one could dispense with the provision of a radial section 15 in the passage 13. In consequence, the passage 13 could also be in the form of an axial groove in the outer surface of the shaft 2 which ends in the vicinity of the chamber A of the mechanical face seal 3 and can be covered with respect to the interior of the housing 1 by a sleeve or the like which is pushed onto the shaft 2. Furthermore, although the flow medium being fed into the chamber A of the mechanical face seal 3 through the passage 13 is preferably the oil requiring sealing due to the passage 13 being connected to the interior of the housing 1, the flow medium could also be introduced into the passage 13 independently of the oil requiring sealing from a separate medium source if so desired. Furthermore, if so desired, the non-rotational seal ring rather than the rotary seal ring could be axially moveable and biased against the rotary seal ring by means of a spring bias force.

The invention claimed is:

1. An arrangement of a shaft with a mechanical face seal mounted thereon, said mechanical face seal comprising a pair of cooperating seal rings having seal faces delimiting a seal gap therebetween, in which one of the seal rings is disposed on the shaft in torque transmitting relationship with a driver member mounted on the shaft, whilst the other seal ring is provided for non-rotational mounting on a stationary component, wherein the driver member comprises a tubular driver housing extending around the outer periphery of the seal ring with a continuous radial gap defined between the driver housing and the seal ring, wherein at least one passage for introducing a flow medium is provided in the shaft, said passage opening out at one end in a chamber defined by the driver housing, wherein the continuous radial gap forms an axial flow path for the flow medium, the axial flow path extending from the chamber to the seal gap such that said flow medium drains out through the radial gap.

2. The arrangement according to claim 1, wherein the driver housing comprises at one axial end thereof an element for diverting the stream of flow medium towards the seal gap.

3. The arrangement according to claim 1, wherein the passage has a section which is disposed essentially radially in the shaft and emerges in the chamber.

4. The arrangement according to claim 1, wherein the flow medium is the medium requiring sealing present in the interior of a housing into which the passage opens out at the other end.

5. The arrangement according to claim 1, wherein the radial gap has a throughput cross-section which is at least equal to, or greater than that of the passage.

6. The arrangement according to claim 1, wherein the radial gap has a throughput cross-section which is smaller than that of the passage in order to produce an increase in the rate of flow in the gap.

* * * * *